United States Patent
States

Patent Number: 5,188,008
Date of Patent: Feb. 23, 1993

[54] CLUSTER NUT TOOL

[76] Inventor: Ronald States, 12 Arlington St., West Medford, Mass. 02155

[21] Appl. No.: 619,814

[22] Filed: Dec. 29, 1990

Related U.S. Application Data

[63] Continuation of Ser. No. 425,482, Oct. 23, 1989, abandoned.

[51] Int. Cl.⁵ .............................................. B25B 9/00
[52] U.S. Cl. ........................................................ 81/13
[58] Field of Search ............................................. 81/13

[56] References Cited

U.S. PATENT DOCUMENTS

| | | | |
|---|---|---|---|
| 1,474,233 | 11/1923 | Bryan et al. | 81/13 |
| 2,196,929 | 4/1940 | Lizakowski | 81/13 |
| 2,305,274 | 12/1942 | Power | 81/13 |
| 2,387,545 | 10/1945 | Veney | 81/13 |

*Primary Examiner*—James G. Smith
*Attorney, Agent, or Firm*—Samuels, Gauthier & Stevens

[57] ABSTRACT

The present tool is a nut holding tool having a crescent shape with a series of hexagonal shaped holes to fit the size of the nuts.

2 Claims, 1 Drawing Sheet

CLUSTER NUT TOOL

This is a continuation of copending application Ser. No. 07/425,482 filed on Oct. 23, 1989 now abandoned.

This invention relates to improvement in tire removal devices in the form of a crescent shaped tool for removal of rear wheel lug nuts on trucks and trailers having dual "Budd Rims."

A great deal of difficulty has been experienced in trying to separate the outer cluster of lug nuts from the inner lug nuts when a tire rim has been removed from a truck or trailer. Due to weather conditions, age, rust or paint getting on the outer cluster of lug nuts as well as the inner lug nuts the inner and outer nuts are "frozen" together.

The object of this invention is to provide a means of holding several outer cluster lug nuts together so that a 13/16 impact socket and air wrench may be fitted around one of the inner lug nuts which protrudes throught the outer cluster lug nut. Now the inner lug is forced out through the back of the rim. If you did not have the "Banana Cluster Nut Tool" holding five of the outer nuts together, then, when you applied the impact tool to one inner lug nut to remove it, it would simply spin around together with the outer cluster lug nut. Now when you get down to removing the last nut in the set of five held by the invention it will spin around because the other nuts have been removed and there is nothing to grab on to with the "Banana Cluster Nut Tool." So you merly screw loosely into one of the open holes in the "Banana Cluster Nut Tool" one of the inner lug nuts and outer lug nuts which have already been removed.

Other objects and a fuller understanding of the invention may be had by referring to the following description and claims taken in conjunction with the accompanying drawing in which FIG. 1 represents a view of the invention itself.

Figure 1:
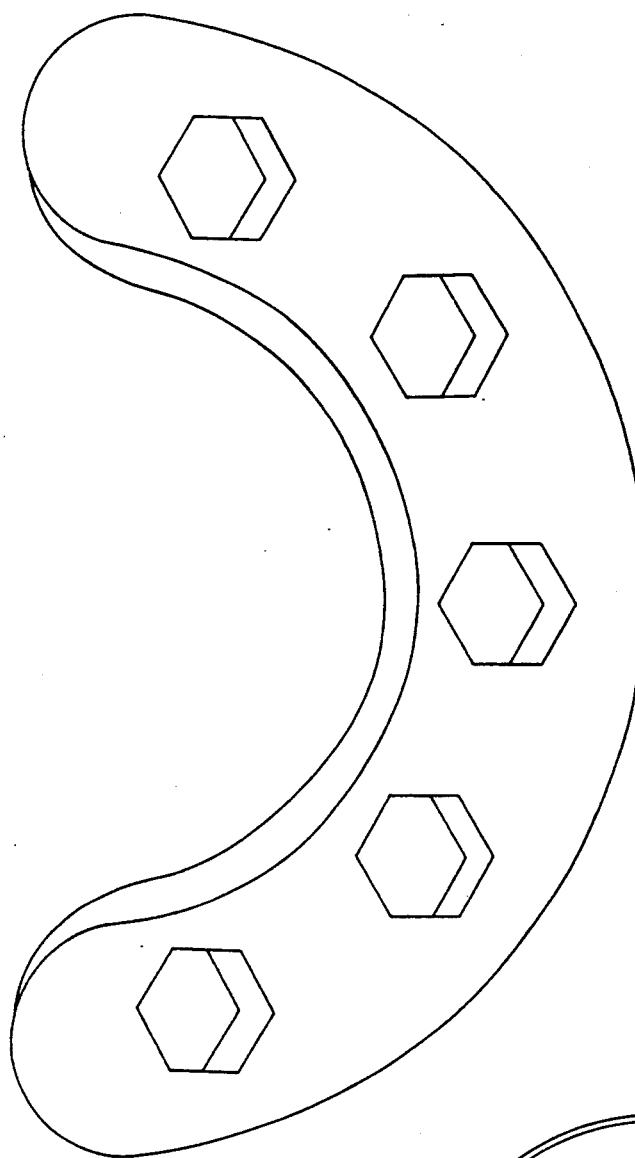
Figure 3:
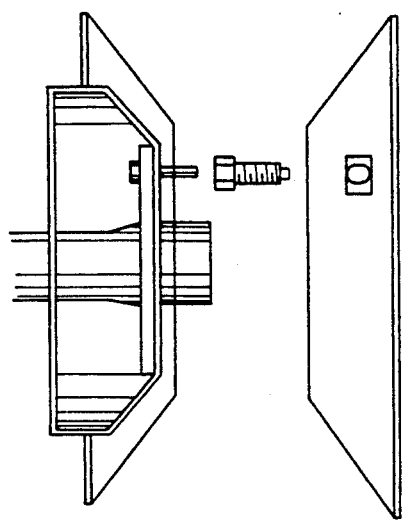
FIG. 3 is a showing of the wheel assembly.
Figure 2:
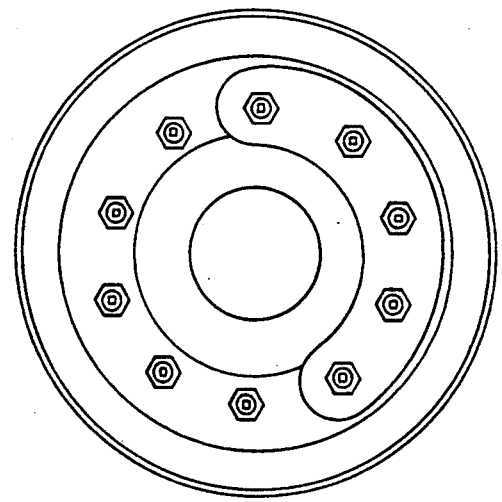
FIG. 2 is a view of the invention seated on the outer tire rim which shows the inner lug nut which will protrude through the the outer rim and fastens onto an outer cluster nut.

With reference to the drawing shown in FIG. 1 the finished product is a crescent shaped piece of drop forged steel having a diameter of ½ inch, being 15 inches in length and 3 inches wide. It has five equidistant hexagon holes so made to receive five 1½ inch lug nuts.

I claim as my invention:

1. A cluster nut tool comprising a crescent-shaped body having a plurality of equidistant hexagonal holes formed therein arrayed in seriatim, the holes adapted to engage corresponding hexagonal nuts to prevent movement thereof when a torque is applied to a fastener of which the hexagonal nut is an integral part, said body solely absorbing the torque forces when the tool is used.

2. The tool of claim 1 wherein there are five holes.

* * * * *